Oct. 2, 1928.
A. LIEBER
1,686,455
OVERRUNNING SPRING CLUTCH
Filed Nov. 25, 1925
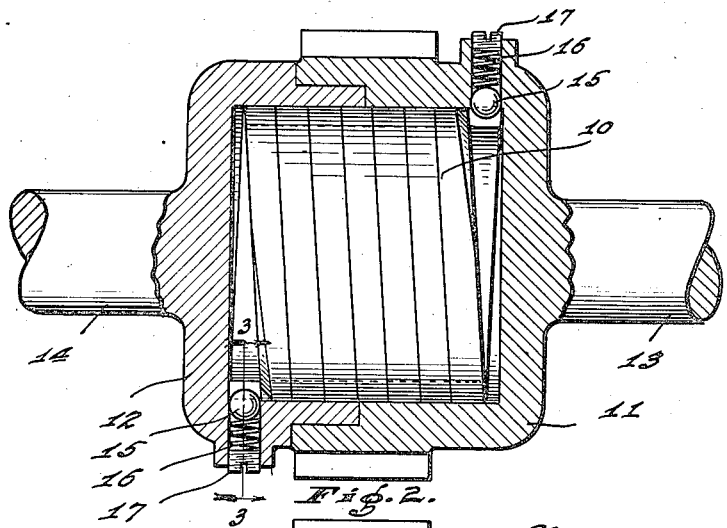
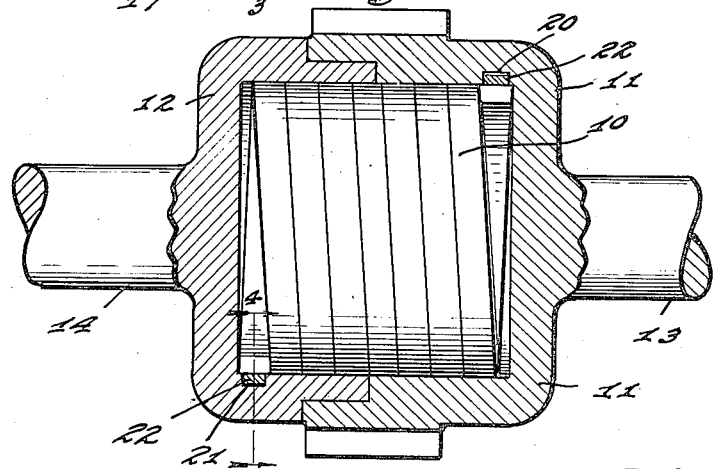
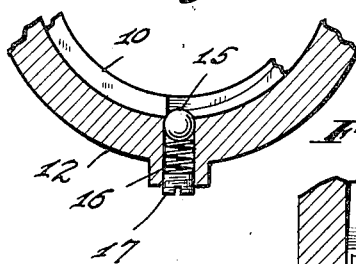
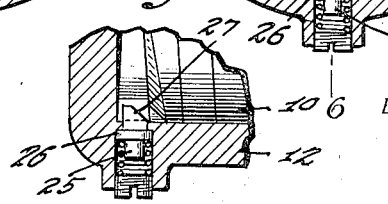
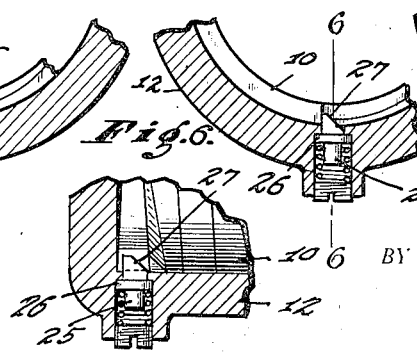
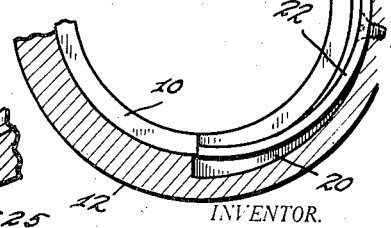
INVENTOR.
ALBERT LIEBER,
BY
G. W. Schley.
ATTORNEY.

Patented Oct. 2, 1928.

1,686,455

UNITED STATES PATENT OFFICE.

ALBERT LIEBER, OF INDIANAPOLIS, INDIANA, ASSIGNOR TO L. G. S. DEVICES CORPORATION, OF INDIANAPOLIS, INDIANA, A CORPORATION OF INDIANA.

OVERRUNNING SPRING CLUTCH.

Application filed November 25, 1925. Serial No. 71,281.

My invention is concerned with coil-spring clutches for co-operating with two relatively rotatable parts to prevent their relative rotation in one direction while permitting free relative rotation in the other direction. In clutches of this kind, a coil-spring is operatively engaged with one of the rotatable members and co-operates with a cylindrical surface on the other member so that the spring will grip such cylindrical surface when its diameter changes under an impressed torque in one direction and will tend to recede from such surface and permit free relative rotation of the two parts in the other direction.

One type of such a clutch, in which the coil-spring engages internal cylindrical surfaces on the two relatively rotatable members, is shown and described in United States Letters Patent No. 1,006,500, issued to E. B. Peterson, on October 24, 1911. Such a clutch comprises a coil spring located in alined axial recesses in two relatively rotatable parts and is adapted to clutch such two parts together when they tend to rotate relatively in a direction to unwind the spring and to permit free relative rotation of the parts in the opposite direction.

It frequently happens that when such a clutch is engaged a few spring-turns near the center of the spring do all the work of clutching while the spring-turns near each end of the spring have not been subjected to any unwinding and therefore perform no part in the work of clutching the two parts together.

It is the object of my invention to provide such a clutch with means which will not interfere with the free relative rotation of the two parts in a direction tending to cause the spring to recede from its associated surface but which will operate when the two parts tend to rotate relatively in the opposite direction to insure that all the turns of the spring act with equal efficacy in performing the work of clutching the two parts together.

I accomplish the above object by providing either or both of the relatively rotatable parts with a ratchet device which will permit relative rotation of such parts and the spring in one direction but will prevent relative rotation in the other direction.

The accompanying drawing illustrates my invention: Fig. 1 is a longitudinal section through a coil-spring clutch equipped with one form of my invention and adapted to operate between two co-axial shafts; Fig. 2 is a view similar to Fig. 1 showing a clutch provided with another form of my invention; Fig. 3 is a transverse section on the line 3—3 of Fig. 1; Fig. 4 is a transverse section on the line 4—4 of Fig. 2; Fig. 5 is a fragmental transverse section of a clutch provided with a further modification of my invention; and Fig. 6 is a fragmental longitudinal section on the line 6—6 of Fig. 5.

As illustrated, my improved clutch comprises a coil-spring 10 located in alined recesses in two cup-shaped parts 11 and 12 which are rigid respectively with two relatively rotatable shafts 13 and 14. This showing is merely illustrative, as such a clutch can be used between any two relatively rotatable, coaxial members. The spring 10 is preferably of such diameter that it bears lightly against the walls of the recesses in the cups 11 and 12 so that when the two shafts 13 and 14 tend to rotate relatively in a direction to unwind the spring the spring is expanded and is forced into firm frictional engagement with the walls of such recesses and thus clutches the two shafts together. When the two shafts 13 and 14 rotate relatively in a direction to wind the spring, the spring decreases slightly in diameter and permits such relative rotation.

To insure that all the turns of the coil-spring will perform an equal part in the work of clutching the two parts together, I provide one or both of the cups 11 and 12 with a ratchet device which co-operates with one end of the spring 10 to prevent relative rotation of such cup and the spring in one direction while permitting free relative rotation in the opposite direction.

In the modification of my invention illustrated in Figs. 1 and 3, this ratchet device comprises a ball 15 which is located in a radial hole in the cup in position to engage the spring-end associated with such cup. The hole in which the ball 15 is located is provided with a slight shoulder at its inner end to prevent the passage of the ball into the interior of the cup. The ball 15 is spring-pressed inwardly by means of a compression spring 16 which operates between the ball and a screw-threaded plug 17 in the wall of the cup. When the ball 15 is held against its associated shoulder by the spring 16, it projects into the interior of the cup far enough to engage the substantially radial end surface of the spring 10, as is evident from Fig. 3. The ball 15 in engaging the end of the spring 10 operates to prevent rotation of the spring 10 in a counter-clockwise direction (Fig. 3) relative to the cup 12.

When the spring 10 tends to rotate in a clockwise direction (Fig. 3) relative to the cup 12, the ball 15 is engaged axially by the last turn of the coil-spring, such last spring-turn being chamfered for a distance as is evident from Fig. 1 in order to force the ball 15 outward against the pressure of the spring 16. When, therefore, the coil-spring 10 rotates relatively to the cup 12 in a direction to wind the spring, the spring forces the ball 15 outward and permits such relative rotation.

In the modification of my invention illustrated in Figs. 2 and 4, I provide one or both of the cups 11 and 12 with a slot 20 located in the wall of the cup and extending for a portion of the circumference thereof. Preferably, this slot 20 is slightly narrower axially than the width of the material from which the spring is wound in order that the spring may not drop into the slot. Located in the slot and secured to the cup 12 as by screws 21 is a leaf spring 22 which projects radially inward in position to engage the end of the spring 10. This spring 22 has the same function as the ball 15, and prevents relative rotation of the spring and the cup in one direction while permitting it in the other.

A still further modification of my invention is illustrated in Figs. 5 and 6, in which a plunger 25 is used instead of the ball 15 shown in Figs. 1 and 3. The plunger 25 is provided with a shoulder 26 adapted to engage a corresponding shoulder in the hole in which the plunger is located. A lug 27 on the plunger 25 projects into the interior of the cup 12 in position to engage the end of the spring 10. The face of the lug 27 which engages the end of the spring 10 is preferably radial and the face of the lug 27 which engages axially the last spring-turn is beveled, as is clear from Fig. 6. When the spring 10 tends to rotate in a counter-clockwise direction (Fig. 5) relative to the cup 12, the end of the spring engages the radial face of the lug 27 and further relative rotation of the spring and cup is prevented. Upon relative rotation in the other direction, the last turn of the spring 10 engages the beveled face of the lug 27, forces such lug outwardly against the pressure of the spring 16, and permits the clutch spring and cup to rotate relatively to each other.

It will be evident that all the modifications of my invention illustrated perform the same function. When the two shafts 13 and 14 tend to rotate relatively in a direction to unwind the spring, the ends of the spring are engaged either by the ball 15, the spring 22, or the lug 27, and further rotation of the spring and its associated parts is prevented. As the two shafts 13 and 14 are rotated in a direction tending to unwind the spring, the spring expands in diameter and grips firmly the walls of its associated recesses to lock the two shafts together. When the two shafts tend to rotate relatively in the opposite direction, the spring 10 tends to become smaller in diameter and to recede from the walls of the associated recesses to permit such relative rotation. As the two shafts rotate relatively in a direction tending to wind the spring, the ratchet devices in each cup are retracted to permit such relative rotation.

I claim as my invention:—

1. In combination, two relatively rotatable members having alined circular recesses, a coil-spring located in said recesses, and a ratchet device operating between said spring and one of said members to prevent relative rotation of said spring and such member in a direction to unwind said spring, whereby to cause said spring to expand into gripping engagement with the walls of its associated recesses.

2. In combination, two relatively rotatable members, an axial recess in one of said members, a coil-spring located in such recess and adapted to engage operatively the other of said members, and a ratchet device operating between said spring and said recessed member to prevent relative rotation of said spring and said recessed member in a direction to unwind said spring, whereby to cause said spring to expand into gripping engagement with the walls of its associated recess.

3. The combination set forth in claim 1, with the addition that said ratchet means co-operates with said spring near one end thereof.

4. In combination, two relatively rotatable members having alined circular recesses, a coil-spring located in said recesses, and a part rotatable with one of said members and spring-pressed into the path of the adjacent end of said coil spring whereby it may engage such spring-end and tend to prevent relative rotation of said spring and the member carrying said part when such member and spring tend to rotate relatively in a direction to unwind said spring, whereby to cause said spring to expand into gripping engagement with the walls of its associated recesses.

5. In combination, two relatively rotatable members, an axial recess in one of said members, a coil-spring located in said recess and adapted to engage operatively the other of said members, a part rotatable with said recessed member and spring-pressed into the path of the adjacent end of said spring whereby it may engage such spring-end and tend to prevent relative rotation of said spring and said recessed member when such member and said spring tend to rotate relatively in a direction to unwind said spring, whereby to cause said spring to expand into gripping engagement with the walls of its associated recess.

In witness whereof, I have hereunto set my hand at Indianapolis, Indiana, this 20th day of November, A. D. one thousand nine hundred and twenty-five.

ALBERT LIEBER.